Patented Mar. 5, 1940

2,192,485

UNITED STATES PATENT OFFICE 2,192,485

PROCESS OF PRODUCING PHENOL-PHTHALEIN

Max Hubacher, Valley Stream, N. Y., assignor to Ex Lax, Inc., Brooklyn, N. Y., a corporation of New York No Drawing. Application November 23, 1938, Serial No. 241,933

5 Claims. (Cl. 260—337)

The present invention relates to improvements in processes of manufacturing phenolphthalein of high purity, in relatively short time for the completion of the process, and at relatively low cost.

Phenolphthalein is obtained by the condensation of phenol with phthalic anhydride in the presence of a condensing agent, many of which have been proposed, including concentrated sulfuric acid, stannic chloride and anhydrous zinc chloride.

The use of stannic chloride is commercially prohibitive on account of its high price. The use of concentrated sulfuric acid has the disadvantage that tarry by-products are formed and also phenol-sulfonic acid. A part of the phenol is thus withdrawn from reacting to phenolphthalein and, as a consequence, the yields are not satisfactory.

When phenol and phthalic anhydride are heated in the presence of anhydrous commercial zinc chloride, then the condensation reaction proceeds slowly. Herzog, W. (Chemiker-Zeitung 51, 84 (1927)) after heating the reagents for 40 hours to 115°–120° obtained phenolphthalein in a yield of only 58% of the theoretical based on the phenol charged.

W. R. Orndorff and W. R. Barrett (J. Am. Ch. Soc. 46, 2487 (1924)) report a yield of only 54% after heating phenol with phthalic anhydride in the presence of zinc chloride for 3 days at 120°–130°.

Anhydrous aluminum chloride was proposed in the preparation of phenolphthalein by Ch. F. Ward (J. Chem. Soc. 119, 850-2). It has several disadvantages. During the reaction copious amounts of hydrochloric acid gas are evolved, necessitating special adsorption equipment. Furthermore, the reaction mixture sets to a solid mass which can be removed from the reaction vessel only with great difficulty. Finally, the yield on phenolphthalein is only 35% of the theoretic yield calculated on the phthalic anhydride added, despite the fact that a 100% excess over theory on phenol was charged.

I have discovered that when a mixture of anhydrous technical zinc chloride and anhydrous technical aluminum chloride is employed as a condensing reagent, then many advantages result. The reaction proceeds smoothly, the yield of phenolphthalein is very high and the time of reaction is only about 16 hours. Furthermore, the reaction product is of high purity, making the further purification easier and the reaction mixture does not set to a solid mass.

I have found that relatively small amounts of anhydrous aluminum chloride admixed to the anhydrous zinc chloride give the beneficial results. For example, for each 100 pounds zinc chloride, 3 to 20 pounds aluminum chloride are added. The aluminum chloride may be either mixed with the zinc chloride beforehand or the two salts may be added separately to the reaction mixture.

The preferred temperature for carrying out the condensation is 120° C., but good results are obtained within a range of 100° to 135° C. The time of condensation varies in accordance with the temperature but also with the quantity of the zinc-chloride-aluminum-chloride mixture and the percentage of aluminum chloride contained therein, a higher percentage of the latter generally decreasing the time of reaction. Generally the reaction period is 8 to 16 hours.

The following examples will illustrate clearly the improved process:

*Example I.*—A jacketed enamel kettle is charged with 188 pounds phenol and 148 pounds phthalic anhydride. The mass is heated to 35°–50° to effect liquefaction. After starting the stirrer, a mixture of 80 pounds anhydrous technical zinc chloride and 10 pounds anhydrous technical aluminum chloride is added. The temperature is raised to 116–122° and maintained there for 16 hours. The viscous reaction mass is then dropped through a bottom outlet into a tank containing hot water which has been slightly acidified with mineral acid. After washing the mass repeatedly with hot acidic water, the zinc chloride and aluminum chloride are removed together with unreacted phenol and phthalic anhydride. 274 pounds of crude phenolphthalein of M. P. 253°–259° was obtained. This crude product, after the usual treatment with dilute caustic alkalies to remove the fluoran, yielded 255 pounds yellow phenolphthalein of M. P. 255°–259°. The yield is 80.1% of the theoretical.

*Example II.*—To 188 pounds phenol and 148 pounds phthalic anhydride, after liquefaction at 50°, is added, while stirring, 100 pounds anhydrous zinc chloride and thereupon 6 pounds anhydrous aluminum chloride. The mass is now heated to 120°–124° and stirred at that temperature for 16 hours. 270 pounds crude was obtained and after the removal of the fluoran 259 pounds yellow phenolphthalein of M. P. 256°–259° was obtained. This is a yield of 81.4% of the theoretical.

*Example III.*—A kettle is charged with 188 pounds phenol, 148 pounds phthalic anhydride and 80 pounds anhydrous zinc chloride. The mass is heated to 70°–80°, the stirrer started and 16 pounds anhydrous aluminum chloride added. The mixture is thereupon stirred for 14 hours at 108°–112°. 247 pounds crude phenolphthalein was obtained. This yielded 233 pounds yellow phenolphthalein of M. P. 255°–258°. (73.2% of the theoretical.)

Having described my invention, what I claim and desire to secure by Letters Patent, is as follows:

1. A process of producing phenolphthalein which consists in liquefying by heating a mixture of phenol and phthalic anhydride, adding a mixture of anhydrous zinc chloride and anhydrous aluminum chloride to the liquid, thereupon raising the temperature of the mixture thus produced to above 100° C. and not exceeding 135° C., and after formation of the phenolphthalein removing zinc chloride, aluminum chloride, unreacted phenol and phthalic anhydride.

2. A process of producing phenolphthalein which consists in heating a mixture of phenol and phthalic anhydride in the presence of anhydrous zinc chloride, adding to the mixture anhydrous aluminum chloride, continuing the heating of the mixture whilst stirring the same, and removing the zinc chloride, aluminum chloride, unreacted phenol and phthalic anhydride.

3. A process of producing phenolphthalein characterized by liquefying phenol and phthalic anhydride by heat, adding to the liquid anhydrous zinc chloride and anhydrous aluminum chloride, and increasing the heat to a temperature above that required for liquefaction of the phenol and phthalic anhydride, and stirring the mixture under said heating conditions for a period of hours.

4. A process of producing phenolphthalein which consists in mixing phenol and phthalic anhydride, heating the mixture to a temperature not less than the liquefaction temperature of the mixture in the presence of anhydrous zinc chloride, adding anhydrous aluminum chloride to the mixture, increasing the temperature of the mixture to substantially above the liquefaction temperature of phenol and phthalic anhydride, and stirring the mixture under such heating conditions for a period of hours.

5. A process of producing phenolphthalein, which consists in heating and stirring a mixture comprising phenol, phthalic anhydride, anhydrous zinc chloride in proportions substantially less than either the phenol or phthalic anhydride, and anhydrous aluminum chloride in proportion substantially less than the anhydrous zinc chloride, and maintaining the temperature of the mixture under said conditions of stirring within a range of 100° C. to 135° C. for a period of from 8 to 16 hours.

MAX HUBACHER.